(12) United States Patent
Sasaki

(10) Patent No.: US 9,966,585 B2
(45) Date of Patent: May 8, 2018

(54) ENERGY STORAGE APPARATUS AND METHOD OF MANUFACTURING ENERGY STORAGE APARATUS

(71) Applicant: GS Yuasa International, Ltd., Kyoto-shi, Kyoto (JP)

(72) Inventor: Takeshi Sasaki, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 153 days.

(21) Appl. No.: 14/932,605

(22) Filed: Nov. 4, 2015

(65) Prior Publication Data

US 2016/0126524 A1 May 5, 2016

(30) Foreign Application Priority Data

Nov. 4, 2014 (JP) ................................ 2014-224332
Oct. 26, 2015 (JP) ................................ 2015-209914

(51) Int. Cl.
| | |
|---|---|
| *H01M 2/20* | (2006.01) |
| *H01M 2/10* | (2006.01) |
| *H01M 2/30* | (2006.01) |
| *H01M 10/48* | (2006.01) |

(52) U.S. Cl.
CPC ......... *H01M 2/206* (2013.01); *H01M 2/1077* (2013.01); *H01M 2/30* (2013.01); *H01M 10/482* (2013.01); *H01M 2220/20* (2013.01)

(58) Field of Classification Search
CPC ... H01M 2/1077; H01M 2/1016; H01M 2/022
See application file for complete search history.

(56) References Cited

FOREIGN PATENT DOCUMENTS

| | | |
|---|---|---|
| JP | 2007-026907 A | 2/2007 |
| JP | 2007-073266 A | 3/2007 |
| JP | 2008-181765 A | 8/2008 |
| JP | 2008-186725 A | 8/2008 |
| JP | 2011-129675 A | 6/2011 |
| JP | 2012-079710 A | 4/2012 |
| JP | 2012-178271 A | 9/2012 |

*Primary Examiner* — Olatunji Godo
(74) *Attorney, Agent, or Firm* — Michael Best & Friedrich LLP

(57) ABSTRACT

An energy storage apparatus including: a plurality of energy storage devices each including a pair of external terminals, wherein one of two adjacent energy storage devices among the plurality of energy storage devices includes a connecting portion having at least a convex part at one of the pair of external terminals, the other of the two adjacent energy storage devices includes a connecting portion having at least a concave part at the other of the pair of external terminals, and the convex part is fitted into the concave part.

11 Claims, 12 Drawing Sheets

ENERGY STORAGE APPARATUS AND METHOD OF MANUFACTURING ENERGY STORAGE APARATUS

CROSS-REFERENCE TO RELATED APPLICATIONS

This application claims the benefit of Japanese patent applications No. 2014-224332, filed on Nov. 4, 2014, and No. 2015-209914, filed on Oct. 26, 2015, which are incorporated by reference.

FIELD

The present invention relates to an energy storage apparatus including two or more energy storage devices and a method of manufacturing an energy storage apparatus.

BACKGROUND

Since various kinds of equipment such as electric vehicles and hybrid electric vehicles require power sources having large capacity, there is provided a battery pack including a plurality of battery cells 6 as shown in FIG. 10 (see Japanese Unexamined Patent Application Publication No. 2008-181765, for example).

As shown in FIG. 11, the plurality of battery cells 6 each has a prismatic exterior case 60 and a pair of electrode terminals 61 protruding from an upper face of the exterior case 60.

The electrode terminals 61 each have a bent piece 610 formed by bending a plate-like member. The bent piece 610 has a first piece 611 protruding upward from the exterior case 60 and a second piece 612 extending from the first piece 611 and extending in a direction orthogonal to a direction in which the first piece 611 extends. A coupling hole 613 is formed in the second piece 612.

In the battery pack, the second pieces 612 of the adjacent battery cells 6 are brought into contact with each other and the battery cells 6 are electrically connected to each other. Further, in the battery pack, a fastening member such as a rivet and a bolt (a rivet in the case of the battery pack shown in FIG. 12) is inserted into the coupling hole 613 of each of the second pieces 612 being in contact with each other. Then, the second pieces 612 being in contact with each other are fastened to each other by the fastening member.

Hence, in the case of manufacturing the battery pack, when the fastening member is inserted into the coupling hole 613 of each of the second pieces 612 of the adjacent battery cells 6, it is necessary to align the coupling holes 613 of the second pieces 612 with each other. Therefore, the work of electrically connecting the adjacent battery cells 6 is complicated.

Moreover, in the battery pack, when the second pieces 612 of the adjacent battery cells 6 are not properly fastened to each other, connection between the second pieces 612 of the adjacent battery cells 6 is occasionally released. Hence, electrical connection between the adjacent battery cells 6 is occasionally released.

In the battery pack, a terminal connected to an external circuit (a circuit that electricity flows through partially and that constitutes a part of an electric circuit, such as a motor, a control unit, or another battery pack) is fastened to each of the electrode terminals 61 of the battery cell 6, for example. Also in this case, when the terminal is not properly fastened to the electrode terminals 61 of the battery cell 6, connection between the electrode terminals 61 of the battery cell 6 and the terminal is occasionally released. Hence, electrical connection between the external circuit and the battery cell 6 is occasionally released.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus that can prevent release of electrical connection to an energy storage device.

Another object of the present invention is to provide a method of manufacturing an energy storage apparatus that can efficiently make connection to an energy storage device.

An energy storage apparatus according to an aspect of the present invention includes a plurality of energy storage devices each having a pair of external terminals. One of two adjacent energy storage devices among the plurality of energy storage devices includes a connecting portion having at least a convex part at one of the pair of external terminals, and the other of the two adjacent energy storage devices includes a connecting portion having at least a concave part at the other of the pair of external terminals. The convex part is fitted into the concave part.

BRIEF DESCRIPTION OF DRAWINGS

The foregoing and other features of the present invention will become apparent from the following description and drawings of an illustrative embodiment of the invention in which.

DESCRIPTION OF EMBODIMENT

Figure 1:
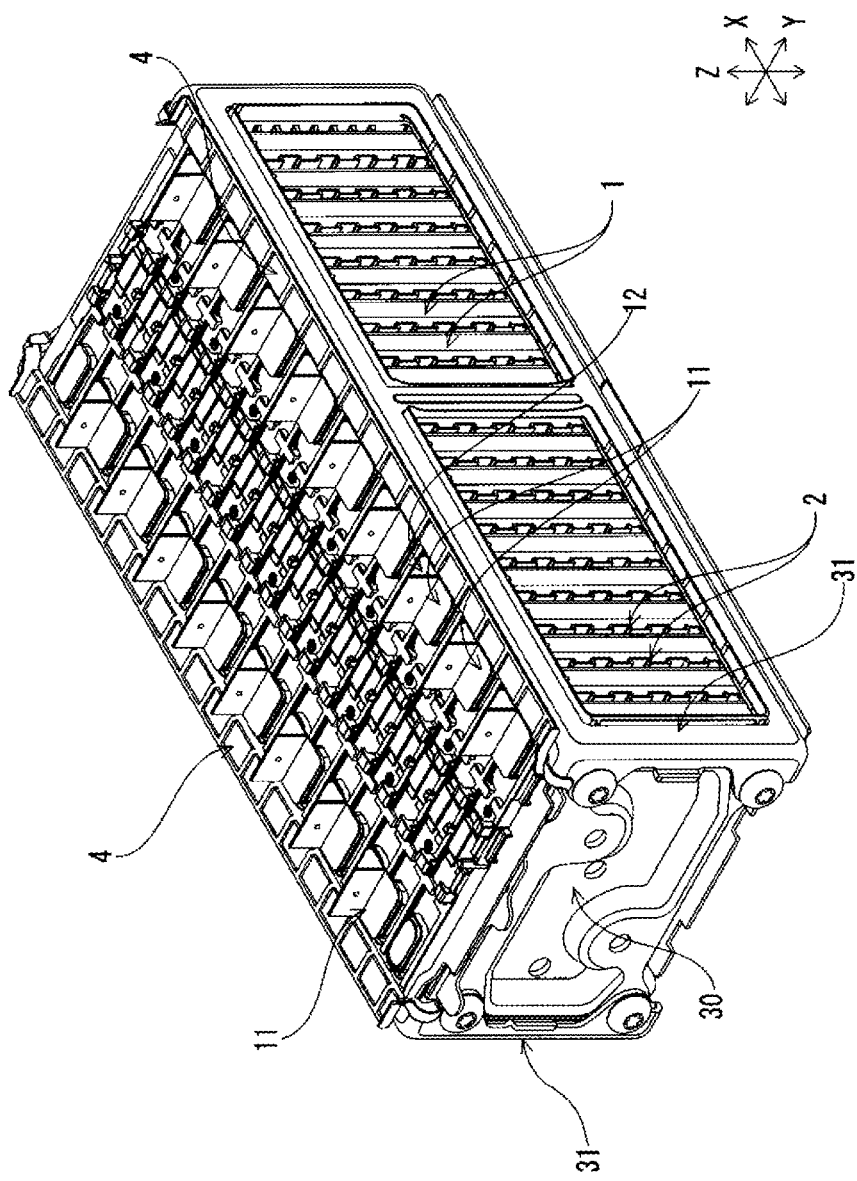
FIG. 1 is a perspective view of an energy storage apparatus according to an embodiment of the present invention.

An energy storage apparatus according to an aspect of the present invention includes a plurality of energy storage devices each having a pair of external terminals. One of two adjacent energy storage devices among the plurality of energy storage devices includes a connecting portion having at least a convex part at one of the pair of external terminals, and the other of the two adjacent energy storage devices includes a connecting portion having at least a concave part at the other of the pair of external terminals. The convex part is fitted into the concave part.

In the energy storage apparatus, the convex part of the one connecting portion in the one energy storage device is fitted into a portion defining the concave part of the other connecting portion in the other energy storage device. Hence, the energy storage apparatus can prevent separation of the two assembled connecting portions. Therefore, the energy storage apparatus can prevent release of electrical connection between the adjacent energy storage devices.

The convex part of the one connecting portion in the one energy storage device may include a front end in a protruding direction, and a base end opposite to the front end. A locking portion having a cross section that becomes larger from the base end toward the front end in a direction orthogonal to the protruding direction of the convex part may be included in the convex part of the one connecting portion in the one energy storage device.

In this manner, the locking portion is fitted into the concave part of the other connecting portion in the other energy storage device, and can prevent separation of the convex part of the one connecting portion in the one energy storage device from the concave part of the other connecting portion in the other energy storage device. Therefore, the energy storage apparatus can prevent more reliably release of electrical connection between the adjacent energy storage devices.

In the energy storage apparatus, the connecting portion of each of the pair of external terminals in two adjacent energy storage devices among the plurality of energy storage devices may include the convex part and the concave part that is located opposite to the convex part and recessed in the same direction as the protruding direction of the convex part. The apparatus may further include a sensor member connected to at least one of the two adjacent energy storage devices, and the sensor member may include a connecting portion having one of a convex part fitted into the concave part of the connecting portion at the one external terminal and a concave part that the convex part of the connecting portion at the other external terminal is fitted into.

In the energy storage apparatus, the connecting portion of the sensor member includes one of the convex part fitted into the concave part of the connecting portion of the one external terminal and the concave part that the convex part of the connecting portion of the other external terminal is fitted into. Hence, the connecting portion of the sensor member can be prevented from being separated from the connecting portion of the one external terminal or the connecting portion of the other external terminal. Therefore, the energy storage apparatus can keep more reliably electrical connection between the sensor member and the external terminals in the one energy storage device or the external terminals in the other energy storage device. That is, the energy storage apparatus can prevent release of electrical connection between the energy storage device and the sensor member.

The connecting portion of the one external terminal may be made of a ductile metal as compared to the connecting portion of the other external terminal.

In this manner, the connecting portion of the one external terminal becomes deformable. Hence, in the energy storage apparatus, damage of the convex part of the connecting portion of the one external terminal can be prevented. Thus, the energy storage apparatus can prevent more reliably separation of the two assembled connecting portions. Therefore, the energy storage apparatus can prevent more reliably release of electrical connection between the adjacent energy storage devices.

The connecting portions of the pair of external terminals each may have a mating face facing the connecting portion of the adjacent external terminal, and an anticorrosive layer may be provided at least on the mating face of each of the connecting portion of the one external terminal and the connecting portion of the other external terminal.

In this manner, corrosion of at least the mating faces of the connecting portion of the one external terminal and the connecting portion of the other external terminal can be prevented.

The connecting portion of the one external terminal and the connecting portion of the other external terminal may be made of different metals, and outer peripheries of the mating faces in the connecting portion of the one external terminal and the connecting portion having the concave part that the convex part of the connecting portion is fitted into may be covered at least partially with an insulating member.

In the case of assembling the two connecting portions made of different metals, when moisture adheres to an interface between the respective connecting portions, electrolytic corrosion is likely to occur in each of the connecting portions. However, in the energy storage apparatus, the outer peripheries in the mating faces of the respective two assembled connecting portions are at least partially covered with the insulating member. Hence, electrolytic corrosion in each of the two connecting portions can be prevented.

According to an aspect of the present invention, a method of manufacturing an energy storage apparatus including a plurality of energy storage devices each having an external terminal includes: aligning the plurality of energy storage devices; bringing connecting portions of the external terminals of two adjacent energy storage devices among the plurality of energy storage devices into contact with each other; and pressing each of the two connecting portions in a state where each of the two connecting portions is sandwiched between a male mold and a female mold.

In the method of manufacturing an energy storage apparatus, the connecting portion of each of the two energy storage devices is pressed in a state where the connecting portion of each of the two energy storage devices is sandwiched between the male mold and the female mold. Hence, while a convex part is formed in one of the two connecting portions being in contact with each other, a concave part that the convex part is fitted into can be formed in the other of the two connecting portions. Hence, the method of manufacturing an energy storage apparatus can assemble the respective connecting portions by the pressing with the molds. Therefore, the method of manufacturing an energy storage apparatus can electrically connect the adjacent energy storage devices efficiently.

The method of manufacturing an energy storage apparatus may further include disposing the external terminal on an outer face of a case that stores an electrode body to construct each energy storage device; and bringing the connecting portions of the external terminals of the two adjacent energy storage devices into contact with each other in a direction orthogonal or substantially orthogonal to a direction in which the case and the external terminal are aligned.

In this manner, in the method of manufacturing an energy storage apparatus, the connecting portion of the external terminal in each of the two adjacent energy storage devices becomes easy to press. Hence, in the method of manufacturing an energy storage apparatus, the connecting portions of the external terminals in the respective two adjacent energy storage devices become easy to assemble. Therefore, the method of manufacturing an energy storage apparatus can electrically connect the adjacent energy storage devices more efficiently.

The method of manufacturing an energy storage apparatus may further include: bringing a sensor member to be connected to the external terminal into contact with the connecting portion of the one external terminal in one of the two energy storage devices or the connecting portion of the other external terminal in the other energy storage device; bringing the sensor member into contact with the one connecting portion in the one energy storage device; and pressing the connecting portion of each of the two external terminals and the sensor member in a state where the connecting portion and the sensor member are sandwiched between a male mold and a female mold.

In the method of manufacturing an energy storage apparatus, the connecting portion of the external terminal of each of the two adjacent energy storage devices and the sensor member are pressed in a state where the connecting portion and the sensor member are sandwiched between the male mold and the female mold. Hence, a convex part fitted into the concave part of the connecting portion at the one external terminal, or a concave part that the convex part of the connecting portion at the other external terminal is fitted into is formed in a connecting portion of the sensor member. Hence, in the method of manufacturing an energy storage apparatus, the respective connecting portions can be assembled without the necessity of aligning the connecting portion in the sensor member and the connecting portion of the external terminal of each of the two energy storage devices. Therefore, the method of manufacturing an energy storage apparatus can electrically connect the adjacent energy storage devices efficiently. Further, the method of manufacturing an energy storage apparatus can electrically connect an external terminal and the energy storage devices efficiently.

An energy storage apparatus according to another aspect of the present invention includes at least one energy storage device including an external terminal; and an external output terminal for connecting the energy storage device to an external circuit. One of the external terminal and the external output terminal includes a connecting portion having at least a convex part, and the other of the external terminal and the external output terminal includes a connecting portion having at least a concave part. The convex part is fitted into the concave part.

In the energy storage apparatus, the convex part included in one of the connecting portion of the external terminal and the connecting portion of the external output terminal is fitted into a portion defining the concave part included in the other of the connecting portion of the external terminal and the connecting portion of the external output terminal. Hence, the energy storage apparatus can prevent separation of the assembled connecting portions of the external terminal and of the external output terminal. Therefore, the energy storage apparatus can prevent release of electrical connection between the energy storage device and the external circuit.

In this case, the energy storage apparatus may further include a sensor member connected to at least one of the external terminal and the external output terminal. The connecting portion of each of the external terminal and the external output terminal may include the convex part and the concave part that is located opposite to the convex part and recessed in the same direction as a protruding direction of the convex part. The sensor member may include a connecting portion having at least one of a convex part fitted into the concave part of the connecting portion of the external terminal or the concave part of the connecting portion of the external output terminal, and a concave part that the convex part of the connecting portion of the external terminal or the convex part of the connecting portion of the external output terminal is fitted into.

When the connecting portion of the sensor member includes the convex part, the convex part of the connecting portion of the sensor member is fitted into one of the concave part of the connecting portion of the external terminal and the concave part of the connecting portion of the external output terminal. Hence, the energy storage apparatus can prevent separation of the sensor member from the external terminal or the external output terminal.

Moreover, when the connecting portion of the sensor member includes the concave part, one of the convex part of the connecting portion of the external terminal and the convex part of the connecting portion of the external output terminal is fitted into the concave part of the connecting portion of the sensor member. Also in this case, the energy storage apparatus can prevent separation of the sensor member from the external terminal or the external output terminal.

Therefore, the energy storage apparatus can prevent release of electrical connection between the energy storage device and the sensor member.

Moreover, an energy storage apparatus according to still another aspect of the present invention includes an external output terminal for connecting an energy storage device to an external circuit; and an external circuit terminal that is a part of the external circuit and is electrically connected to the external output terminal. One of the external output terminal and the external circuit terminal includes a connecting portion having at least a convex part, and the other of the external output terminal and the external circuit terminal includes a connecting portion having at least a concave part. The convex part is fitted into the concave part.

In the energy storage apparatus, the convex part included in one of the connecting portion of the external output terminal and the connecting portion of the external circuit terminal is fitted into the concave part included in the other of the connecting portion of the external output terminal and the connecting portion of the external circuit terminal. Hence, the energy storage apparatus can prevent separation of the connecting portion of the external output terminal from the connecting portion of the external circuit terminal. Therefore, the energy storage apparatus can prevent release of electrical connection between the energy storage device and the external circuit.

In this case, the energy storage apparatus may further include a sensor member connected to at least one of the external output terminal and the external circuit terminal. The connecting portion of the external output terminal and the connecting portion of the external circuit terminal may each include the convex part and the concave part that is located opposite to the convex part and recessed in the same direction as a protruding direction of the convex part. The sensor member may include a connecting portion having at least one of a convex part fitted into the concave part of the connecting portion of the external output terminal or the concave part of the connecting portion of the external circuit terminal, and a concave part that the convex part of the connecting portion of the external output terminal or the convex part of the connecting portion of the external circuit terminal is fitted into.

In the energy storage apparatus, when the connecting portion of the sensor member includes the convex part, the convex part of the sensor member is fitted into one of the concave part of the connecting portion of the external output terminal and the concave part of the connecting portion of the external circuit terminal. Hence, the energy storage apparatus can prevent separation of the sensor member from the external output terminal or the external circuit terminal.

Moreover, in the energy storage apparatus, when the connecting portion of the sensor member includes the concave part, one of the convex part of the connecting portion of the external output terminal and the convex part of the connecting portion of the external circuit terminal is fitted into the concave part of the connecting portion of the sensor member. Also in this case, the energy storage apparatus can prevent separation of the sensor member from the external output terminal or the external circuit terminal.

Therefore, the energy storage apparatus can prevent release of electrical connection between the energy storage device and the external circuit.

As described above, the energy storage apparatus according to an aspect of the present invention can prevent release of electrical connection to the energy storage device.

Moreover, the method of manufacturing an energy storage apparatus according to an aspect of the present invention can efficiently make connection to the energy storage device.

An embodiment of an energy storage apparatus according to an aspect of the present invention will be described below with reference to the drawings. Names of constituents in this embodiment are used for describing this embodiment, and may be different from the names of the constituents described in the background.

As shown in FIG. 1, an energy storage apparatus includes energy storage devices 1 each having external terminals 11 and 12, a spacer 2 adjacent to each energy storage device 1, and holding members 3 that each hold the energy storage devices 1 and the spacer 2 together. The holding members 3 are molded members of a conductive material. Accordingly, the energy storage apparatus includes insulators 4 each disposed between the energy storage device 1 and the holding member 3. The holding members 3 in this embodiment each include terminal members 30 and frames 31 shown in FIG. 1 as constituents thereof.

The energy storage apparatus according to this embodiment includes the plurality of energy storage devices 1. The plurality of energy storage devices 1 is aligned with each other in one direction. Moreover, in the energy storage apparatus, the external terminals 11 and 12 of the two adjacent energy storage devices 1 are electrically connected to each other.

Note that in the following description, for convenience, the direction in which the energy storage devices 1 are aligned (first direction) is referred to as an X-axis direction. Moreover, one direction (second direction) of biaxial directions orthogonal to the direction in which the energy storage devices 1 are aligned (X-axis direction) is referred to as a Y-axis direction, and the other direction (third direction) is referred to as a Z-axis direction. Each drawing adjunctively shows orthogonal three axes (coordinate axes) corresponding to the X-axis direction, the Y-axis direction, and the Z-axis direction.

The spacer 2 has an insulation property. The energy storage apparatus includes the spacer 2 disposed between the two adjacent energy storage devices 1 in the X-axis direction and the spacer 2 adjacent to the energy storage device 1 disposed at each end in the X-axis direction.

Figure 3:
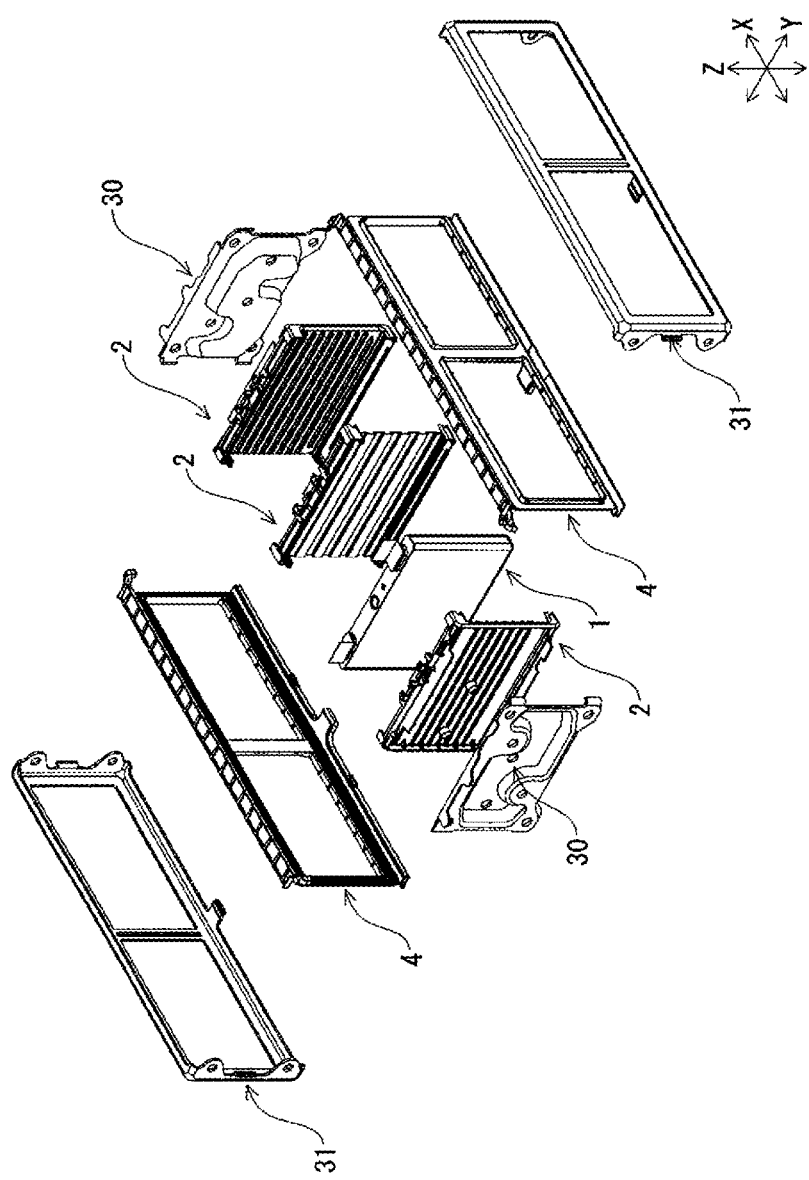
FIG. 3 is an exploded perspective view of the energy storage apparatus.

In this embodiment, the holding members 3 are made of a metal. As shown in FIG. 1 and FIG. 3, the holding members 3 each include the pair of terminal members 30 each disposed at a position adjacent to the spacer 2 disposed at each end in the X-axis direction, and the frames 31 connecting the pair of terminal members 30 to each other.

The insulators 4 are each made of a material having an insulation property. The insulators 4 each are disposed between each of the plurality of energy storage devices 1 and the plurality of holding members 3 (frames 31). Thus, in the energy storage apparatus, the energy storage devices 1 are insulated from the holding members 3.

Figure 2:
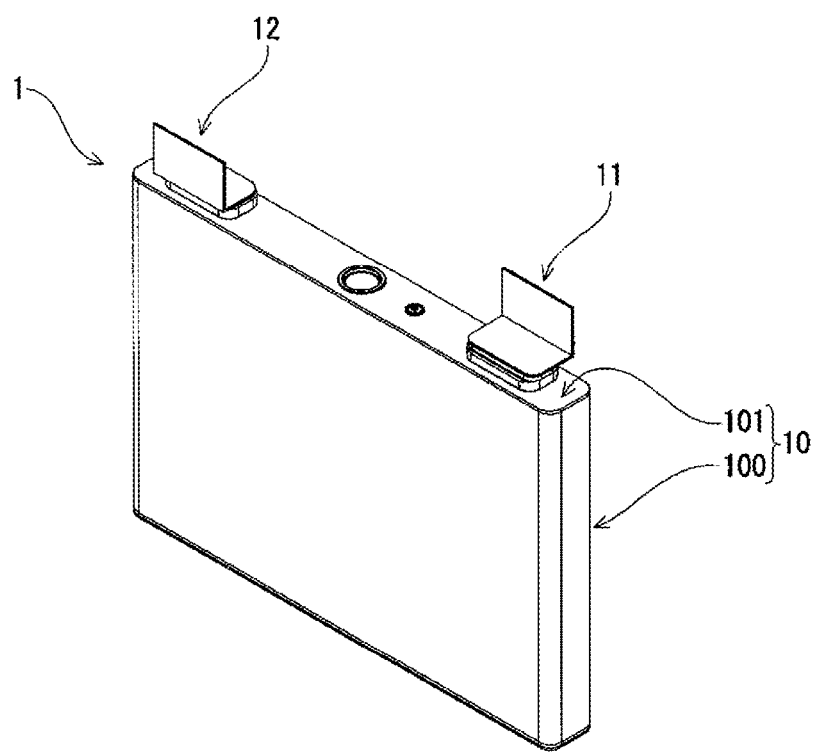
FIG. 2 is a perspective view of an energy storage device of the energy storage apparatus.

As shown in FIG. 2, each of the energy storage devices 1 includes an electrode body having a positive electrode and a negative electrode, a case 10 that stores the electrode body, and the pair of external terminals 11 and 12 disposed on an outer face of the case 10.

The case 10 includes a case body 100 having an opening, and a cover plate 101 that closes the opening of the case body 100, and the pair of external terminals 11 and 12 are disposed on an outer face of the cover plate 101.

The plurality of energy storage devices 1 each includes the negative external terminal 11 and the positive external terminal 12. The one external terminal 11 is connected to the negative electrode of the electrode body. The other external terminal 12 is connected to the positive electrode of the electrode body.

Figure 4:
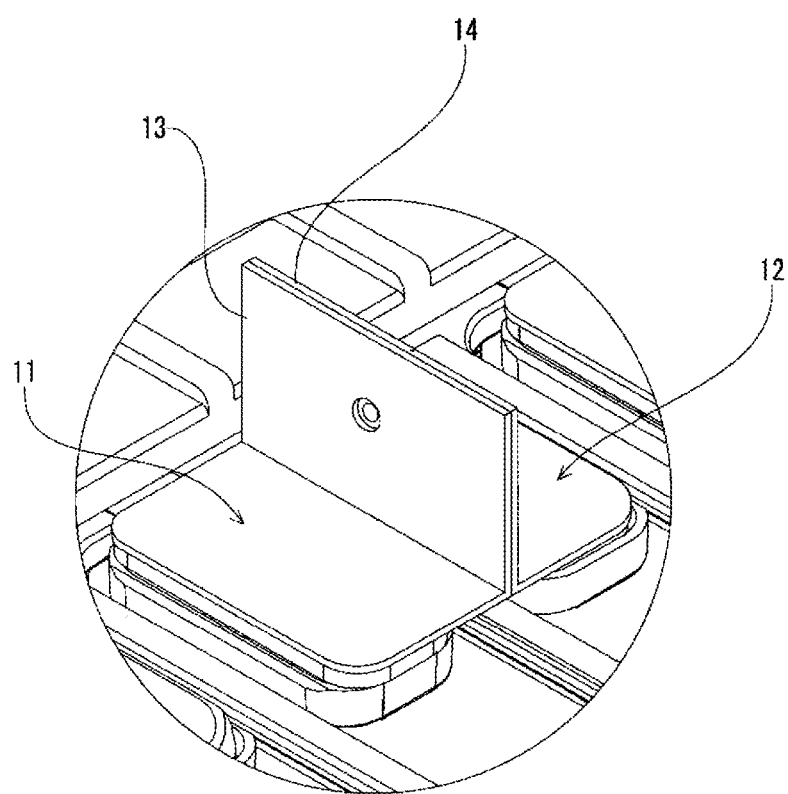
FIG. 4 is a partial enlarged view of the energy storage device.

As shown in FIG. 4, the external terminals 11 and 12 have connecting portions 13 and 14 electrically connected to the external terminals 11 and 12 of the adjacent energy storage device 1.

In this embodiment, the connecting portion 13 of the one external terminal 11 is made of a ductile metal as compared to the connecting portion 14 of the other external terminal 12. Moreover, the connecting portions 13 and 14 of the pair of external terminals 11 and 12 have mating faces facing the connecting portions 13 and 14 of the adjacent external terminals 11 and 12.

Figure 5:
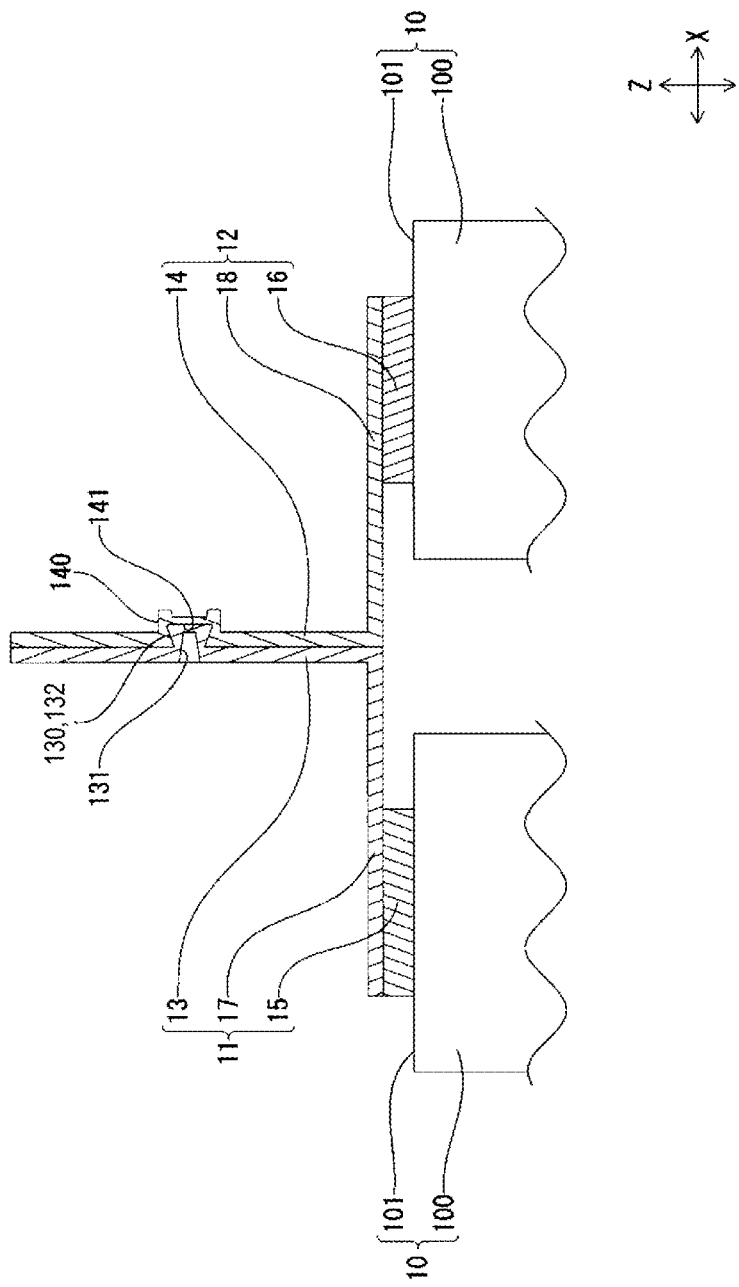
FIG. 5 is a sectional view of external terminals of the energy storage apparatus.

As shown in FIG. 5, the connecting portions 13 and 14 have convex parts 130 and 140 and concave parts 131 and 141 that are located opposite to the convex parts 130 and 140 and recessed in the same directions as directions in which the convex parts 130 and 140 protrude.

In the energy storage apparatus according to this embodiment, the convex part 130 of the connecting portion 13 is formed so as to be fitted into a portion defining the concave part 141 of the connecting portion 14 in the adjacent energy storage device 1. Hence, in the energy storage apparatus, an entire outer face of the convex part 130 of the connecting portion 13 is in contact with an entire inner peripheral face defining the concave part 141 of the connecting portion 14 in the adjacent energy storage device 1 without any gap.

The convex part 130 of the connecting portion 13 includes a front end in the protruding direction and a base end opposite to the front end. The convex part 130 of the connecting portion 13 is provided with a locking portion 132 having a cross section that becomes larger from the base end toward the front end in a direction orthogonal to the protruding direction.

In this embodiment, the convex part 130 is formed so as to have an outer diameter that becomes larger from the base end toward the front end. Hence, the convex part 130 has the entire outer face that constitutes the locking portion 132.

The concave parts 131 and 141 are formed so as to open opposite to the protruding directions of the convex parts 130 and 140. The concave parts 131 and 141 each have a first end at which an opening is formed, and a second end opposite to the first end.

As described above, the convex part 130 is formed so as to have the outer diameter that becomes larger from the base end toward the front end. Accordingly, the concave part 141 is formed so as to have an inner periphery of the first end that becomes larger than an inner periphery of the second end. Hence, in the energy storage apparatus, an outer periphery of a second end of the convex part 130 is larger than the inner periphery of the first end of the concave part 141.

The connecting portions 13 and 14 of the adjacent energy storage devices 1 come into contact with each other in a direction (X-axis direction in this embodiment) orthogonal or substantially orthogonal to a direction in which the case 10 and the external terminal 11 are aligned.

More specifically, the external terminals 11 and 12 in this embodiment include tables 15 and 16 disposed on the outer face of the case 10 (cover plate 101) of the energy storage device 1. Moreover, the external terminals 11 and 12 include mounting portions 17 and 18 joined to the connecting portions 13 and 14 and the tables 15 and 16.

The mounting portions 17 and 18 are disposed on the tables 15 and 16. In the one external terminal 11, the mounting portion 17 is oblong in the X-axis direction.

In the one external terminal 11, the mounting portion 17 extends from the table 15 to one side of the X-axis direction. The mounting portion 17 includes a first end disposed on the table 15 and a second end opposite to the first end. Hence, the second end of the mounting portion 17 is shifted from the table 15 toward one side of the X-axis direction.

The connecting portion 13 is joined to the second end of the mounting portion 17. The connecting portion 13 rises from the second end of the mounting portion 17 (rises in the Z-axis direction). Note that in the one external terminal 11 in this embodiment, the connecting portion 13, the table 15, and the mounting portion 17 are integrally formed.

In the other external terminal 12, the mounting portion 18 is oblong in the X-axis direction. In the other external terminal 12, the mounting portion 18 extends from the table 16 to the other side of the X-axis direction. The mounting portion 18 includes a first end disposed on the table 16 and a second end opposite to the first end. Hence, the second end of the mounting portion 18 is shifted from the table 16 toward the other side of the X-axis direction.

The connecting portion 14 is joined to the second end of the mounting portion 18. The connecting portion 14 rises from the second end of the mounting portion 18 (rises in the Z-axis direction).

Note that in the external terminal 11 in this embodiment, the connecting portion 13 and the mounting portion 17 are formed by bending a conductive plate-like member. Moreover, in the external terminal 12, the connecting portion 14 and the mounting portion 18 are formed by bending a conductive plate-like member. Hence, in this embodiment, each of the member constituting the connecting portion 13 and the mounting portion 17, and the member constituting the connecting portion 14 and the mounting portion 18 may be described below as a conductive member.

The energy storage apparatus according to this embodiment is as described above. Next, a method of manufacturing the energy storage apparatus according to this embodiment will be described with reference to the drawings.

Figure 6:
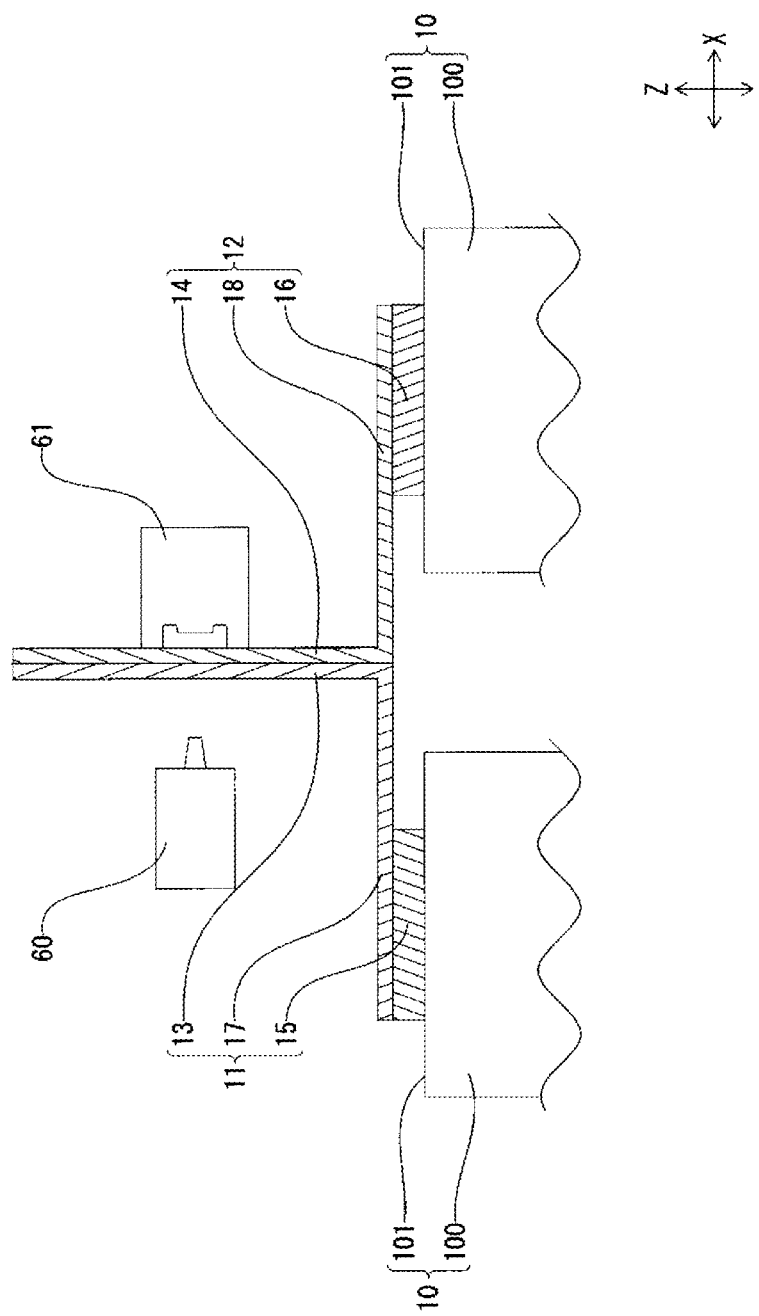
FIG. 6 is an explanatory view of a method of manufacturing the energy storage apparatus, in which connecting portions are aligned with each other.

In the method of manufacturing the energy storage apparatus according to this embodiment, the plurality of energy storage devices 1 is disposed such that the external terminals 11 and 12 are adjacent to each other in the X-axis direction, as shown in FIG. 6.

Thus, in the two energy storage devices 1 adjacent to each other in the X-axis direction, the connecting portion 13 of the external terminal 11 of the one energy storage device 1 faces the connecting portion 14 of the external terminal 12 of the other energy storage device 1 in the X-axis direction. The connecting portion 14 of the external terminal 12 of the one energy storage device 1 faces the connecting portion 13 of the external terminal 11 of the other energy storage device 1 in the X-axis direction. The connecting portions 13 and 14 of the two external terminals 11 and 12 adjacent to each other in the X-axis direction are brought into contact with each other.

Further, the connecting portion 13 of the one external terminal 11 is pressed toward the connecting portion 14 of the other external terminal 12. In this embodiment, the connecting portion 13 of the one external terminal 11 is pressed toward the connecting portion 14 of the other external terminal 12 with a pair of male and female molds 60 and 61. That is, the connecting portions 13 and 14 brought into contact with each other are pressed in a state where the connecting portions 13 and 14 are sandwiched between the male mold 60 and the female mold 61.

More specifically, the connecting portion 13 of the one external terminal 11 and the connecting portion 14 of the other external terminal 12 are sandwiched between the pair of molds 60 and 61 in the X-axis direction. Then, the connecting portion 13 of the one external terminal 11 is pressed with the one mold 60 (male mold 60).

A portion pressed with the one mold 60 in the connecting portion 13 of the one external terminal 11 protrudes toward the connecting portion 14 of the other external terminal 12. At this time, the connecting portion 14 of the other external terminal 12 is pressed with the one mold 60 via the connecting portion 13 of the one external terminal 11.

Figure 7:
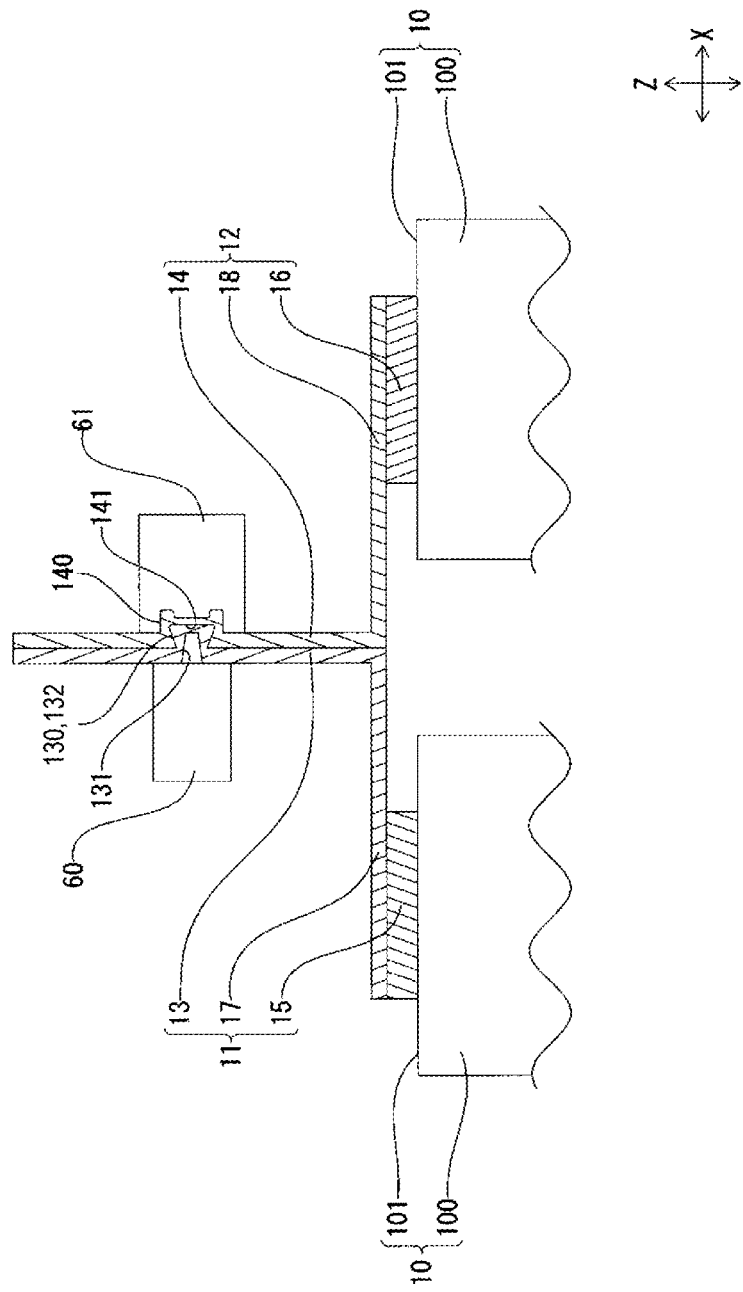
FIG. 7 is an explanatory view of a method of manufacturing the energy storage apparatus, in which connecting portions are connected to each other.

In this manner, as shown in FIG. 7, the convex parts 130 and 140 and the concave parts 131 and 141 located opposite to the convex parts 130 and 140 and recessed in the same directions as the protruding directions of the convex parts 130 and 140 are formed in the connecting portions 13 and 14 being in contact with each other, such that the convex part 130 of the connecting portion 13 is fitted into the portion defining the concave part 141 of the connecting portion 14.

When the connecting portion 13 of the one external terminal 11 is further pressed with the one mold 60 (male mold 60), an outer periphery of a first end of the convex part 130 becomes larger than the outer periphery of the second end of the convex part 130. Moreover, the connecting portion 13 of the negative external terminal 11 is made of a ductile metal as compared to the connecting portion 14 of the positive external terminal 12. When the connecting portion 13 is pressed with the mold 60 and the convex parts 130 and 140 are formed, the degree of deformation of the connecting portion 13 of the negative external terminal 11 is large. In this manner, since the connecting portion 13 of the negative external terminal 11 is made of a ductile metal as compared to the connecting portion 14 of the positive external terminal 12, damage of the convex part 130 can be prevented.

As described above, in the energy storage apparatus according to this embodiment, the convex part 130 of the connecting portion 13 in the one energy storage device 1 is fitted into the portion defining the concave part 141 of the connecting portion 14 in the other energy storage device 1. Thus, the energy storage apparatus can prevent separation of the connecting portion 13 in the one energy storage device 1 from the connecting portion 14 in the other energy storage device 1. Therefore, the energy storage apparatus can prevent release of electrical connection between the adjacent energy storage devices 1.

The locking portion 132 having the cross section that becomes larger from the base end toward the front end in the direction orthogonal to the protruding direction is formed at the convex part 130 of the connecting portion 13 in the one energy storage device 1.

Moreover, the convex part 130 of the connecting portion 13 in the one energy storage device 1 has the locking portion 132 that is fitted into the portion defining the concave part 141 of the connecting portion 14 in the other energy storage device 1. Hence, separation of the convex part 130 of the connecting portion 13 in the one energy storage device 1 from the concave part 141 of the connecting portion 14 in the other energy storage device 1 can be prevented. Therefore, the energy storage apparatus can prevent more reliably release of electrical connection between the adjacent energy storage devices 1.

The convex part 130 of the negative external terminal 11 in the one energy storage device 1 is fitted into the portion defining the concave part 141 of the positive external terminal 12 in the other energy storage device 1.

Hence, the convex part 130 of the negative external terminal 11 in the one energy storage device 1 is covered with the portion defining the concave part 141 of the connecting portion 14 of the positive external terminal 12 in the other energy storage device 1. Hence, in the energy storage apparatus, the convex part 130 of the connecting portion 13 of the negative external terminal 11 in the one energy storage device 1 becomes difficult to deform.

In the method of manufacturing the energy storage apparatus according to this embodiment, the convex parts 130 and 140 and the concave parts 131 and 141 are formed in the connecting portions 13 and 14 of the respective two adjacent energy storage devices 1, such that the convex part 130 of the connecting portion 13 in the one energy storage device 1 is fitted into the portion defining the concave part 141 of the connecting portion 14 in the other energy storage device 1.

Hence, since the method of manufacturing the energy storage apparatus can assemble the connecting portions 13 and 14 by the pressing with the molds 60 and 61, the method can electrically connect the adjacent energy storage devices 1 efficiently.

According to the method of manufacturing the energy storage apparatus, the locking portion 132 having the cross section that becomes larger from the base end toward the front end in the direction orthogonal to the protruding direction of the convex part 130 is formed at the convex part 130 of the connecting portion 13 in the one energy storage device 1.

Hence, the locking portion 132 of the convex part 130 in the one energy storage device 1 can be fitted into the portion defining the concave part 141 of the connecting portion 14 in the other energy storage device 1. Thus, separation of the convex part 130 of the connecting portion 13 in the one energy storage device 1 from the concave part 141 of the connecting portion 14 in the other energy storage device 1 can be prevented. As a result, the adjacent energy storage devices 1 can be connected electrically more efficiently.

In the method of manufacturing the energy storage apparatus, the connecting portions 13 and 14 of the external terminals 11 and 12 in the respective two adjacent energy storage devices 1 are brought into contact with each other in the direction orthogonal or substantially orthogonal to the direction in which the case 10 and the external terminals 11 and 12 are aligned.

For this reason, the connecting portions 13 and 14 of the external terminals 11 and 12 in the respective two adjacent energy storage devices become easy to press. Therefore, in the energy storage apparatus, the connecting portions 13 and 14 of the external terminals 11 and 12 in the respective two adjacent energy storage devices 1 become easy to assemble, and the adjacent energy storage devices 1 can be connected electrically more efficiently.

As described above, according to the method of manufacturing the energy storage apparatus, the adjacent energy storage devices 1 can be connected electrically efficiently.

Note that the energy storage apparatus according to an aspect of the present invention is not limited to the above-described embodiment, and as a matter of course, various modifications may be made within the scope of the spirit of the present invention.

In the embodiment, the convex part 130 and the concave part 131 are formed in the connecting portion 13 of the one external terminal 11. However, the configuration is not limited thereto. For example, the connecting portion 13 of the one external terminal 11 may be configured to include only the convex part 130 fitted into the concave part 141 of the connecting portion 14 of the other external terminal 12.

In this case, the connecting portion 13 of the one external terminal 11 is formed by forming the convex part 130 and the concave part 131 with the molds 60 and 61 and subsequently filling the concave part 131 with a metallic material, a resin material, or the like. Moreover, the convex part 130 may be formed in advance in the connecting portion 13 by forging, and subsequently the convex part 130 may be fitted into a concave part formed in the other terminal.

Moreover, the convex part 140 and the concave part 141 are formed in the connecting portion 13 of the other external terminal 12. However, the configuration is not limited thereto. For example, the connecting portion 14 of the other external terminal 12 may be configured to include only the concave part 141 that the convex part 130 of the connecting portion 13 of the one external terminal 11 is fitted into.

In this case, the connecting portion 14 of the other external terminal 12 is formed by using a flat mold instead of the female mold 61. Moreover, in the embodiment, the connecting portion 14 can be formed by using the male mold 60 and a flat mold to press again locations with the convex part 130 and the concave part 141 formed in the connecting portions 13 and 14.

In the embodiment, the connecting portions 13 and 14 are mounted on the tables 15 and 16 via the mounting portions 17 and 18. However, the configuration is not limited thereto. For example, the connecting portions 13 and 14 may be connected directly (integrally) to the tables 15 and 16.

The connecting portions 13 and 14 are electrically connected to the external terminals 11 and 12 adjacent to each other in the X-axis direction. However, the configuration is not limited thereto. For example, when the energy storage apparatus includes the energy storage devices 1 that are disposed so as to be adjacent to each other in the Y-axis direction, the connecting portions 13 and 14 may be connected electrically to the external terminals 11 and 12 adjacent to each other in the Y-axis direction.

In the embodiment, the connecting portions 13 and 14 are electrically connected to the external terminals 11 and 12 adjacent to each other in the X-axis direction. However, the configuration is not limited thereto. For example, when the energy storage apparatus includes the energy storage devices 1 that are disposed so as to be adjacent to each other in the Y-axis direction, the connecting portions 13 and 14 may be connected electrically to the external terminals 11 and 12 adjacent to each other in the Y-axis direction.

In the embodiment, the connecting portions 13 and 14 face each other in the X-axis direction. However, the configuration is not limited thereto. For example, the connecting portions 13 and 14 may face each other in the Y-axis direction, or may face each other in a direction crossing each of the X-axis direction and the Y-axis direction.

Moreover, the connecting portions 13 and 14 are in contact with the connecting portions 13 and 14 of the adjacent energy storage device 1 in the direction (X-axis direction in this embodiment) orthogonal or substantially orthogonal to the direction in which the case 10 and the external terminal 11 are aligned. However, the configuration is not limited thereto. For example, the connecting portions 13 and 14 may be in contact with each other in the direction (Z-axis direction in this embodiment) in which the case 10 and the external terminal 11 are aligned. However, when the connecting portions 13 and 14 are in contact with each other in the direction orthogonal or substantially orthogonal to the direction in which the case 10 and the external terminal 11 are aligned, the energy storage apparatus can electrically connect the adjacent energy storage devices 1 more efficiently.

Note that although not mentioned in the embodiment, an anticorrosive layer may be provided at least on the mating face of each of the connecting portion 13 of the one external terminal 11 and the connecting portion 14 of the other external terminal 12. In this manner, corrosion of at least the mating faces of the connecting portion 13 of the one external terminal 11 and the connecting portion 14 of the other external terminal 12 can be prevented.

Preferably, a third metal having an ionization tendency between a first metal for a material of the connecting portion 13 of the one external terminal 11 and a second metal for a material of the connecting portion 14 of the other external terminal 12 is used for the anticorrosive layer. Moreover, preferably, a conductive non-metallic material such as a carbon material or a noble metal is used for the anticorrosive layer.

When a metal is used for the anticorrosive layer, the connecting portion 13 and the connecting portion 14 can also be assembled by welding. However, since a metal layer melts at the time of assembling, it is likely that the metal layer will not be maintained at a predetermined position on each of the mating faces of the connecting portion 13 and the connecting portion 14. On the other hand, in the embodiment, the convex part 130 is fitted into the concave part 141. Hence, the anticorrosive layer can be maintained reliably on each of the mating faces of the connecting portion 13 and the connecting portion 14.

When a conductive non-metallic material such as a carbon material is used for the anticorrosive layer, the conductive non-metallic material such as the carbon material does not melt under normal welding conditions. Hence, it is difficult to assemble the connecting portion 13 and the connecting portion 14 by welding. On the other hand, in the embodiment, the convex part 130 is fitted into the concave part 141. Thus, electrical connection between the connecting portion 13 and the connecting portion 14 can be maintained in a state where the anticorrosive layer is provided on each of the mating faces of the connecting portion 13 and the connecting portion 14.

Figure 8:
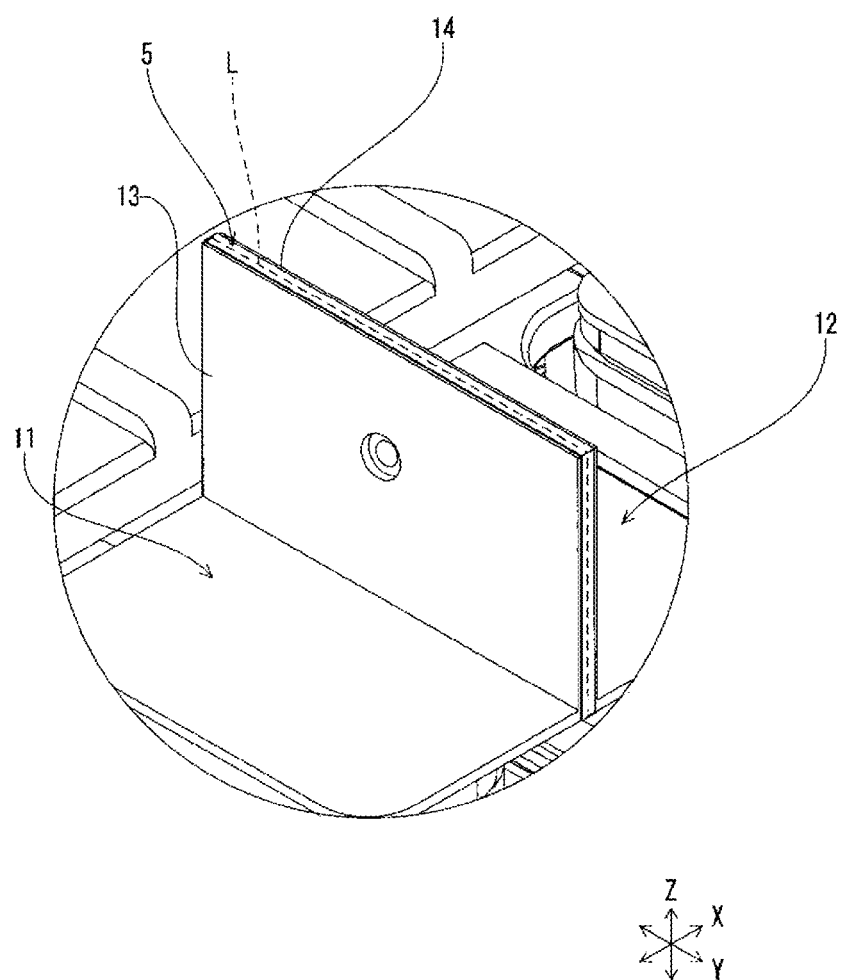
FIG. 8 is a partial enlarged view of an energy storage apparatus according to another embodiment of the present invention.

Moreover, as shown in FIG. 8, the connecting portion 13 of the one external terminal 11 and the connecting portion 14 of the other external terminal 12 may be made of different metals, and outer peripheries of the mating faces of the connecting portions being in contact with each other may be covered at least partially with an insulating member 5 such as an insulating tape. That is, a boundary L between the connecting portion 13 of the one external terminal 11 and the connecting portion 14 of the other external terminal 12 may be covered at least partially with the insulating member 5. Note that in FIG. 8, the entire boundary L between the connecting portion 13 of the one external terminal 11 and the connecting portion 14 of the other external terminal 12 is covered with the insulating member 5.

When the assembled connecting portions 13 and 14 are made of different metals, moisture may adhere to an interface between the connecting portions 13 and 14, and electrolytic corrosion is likely to occur in the connecting portions 13 and 14. However, in the energy storage apparatus, the outer peripheries of the mating faces of the connecting portions 13 and 14 being in contact with each other are at least partially covered with the insulating member 5. Hence, electrolytic corrosion in each of the connecting portions 13 and 14 can be prevented. Moreover, instead of the insulating tape, a part of the insulator 4 or a part of the spacer 2 may extend so as to at least partially cover the boundary L. In this case, the number of components can be reduced.

Figure 9:
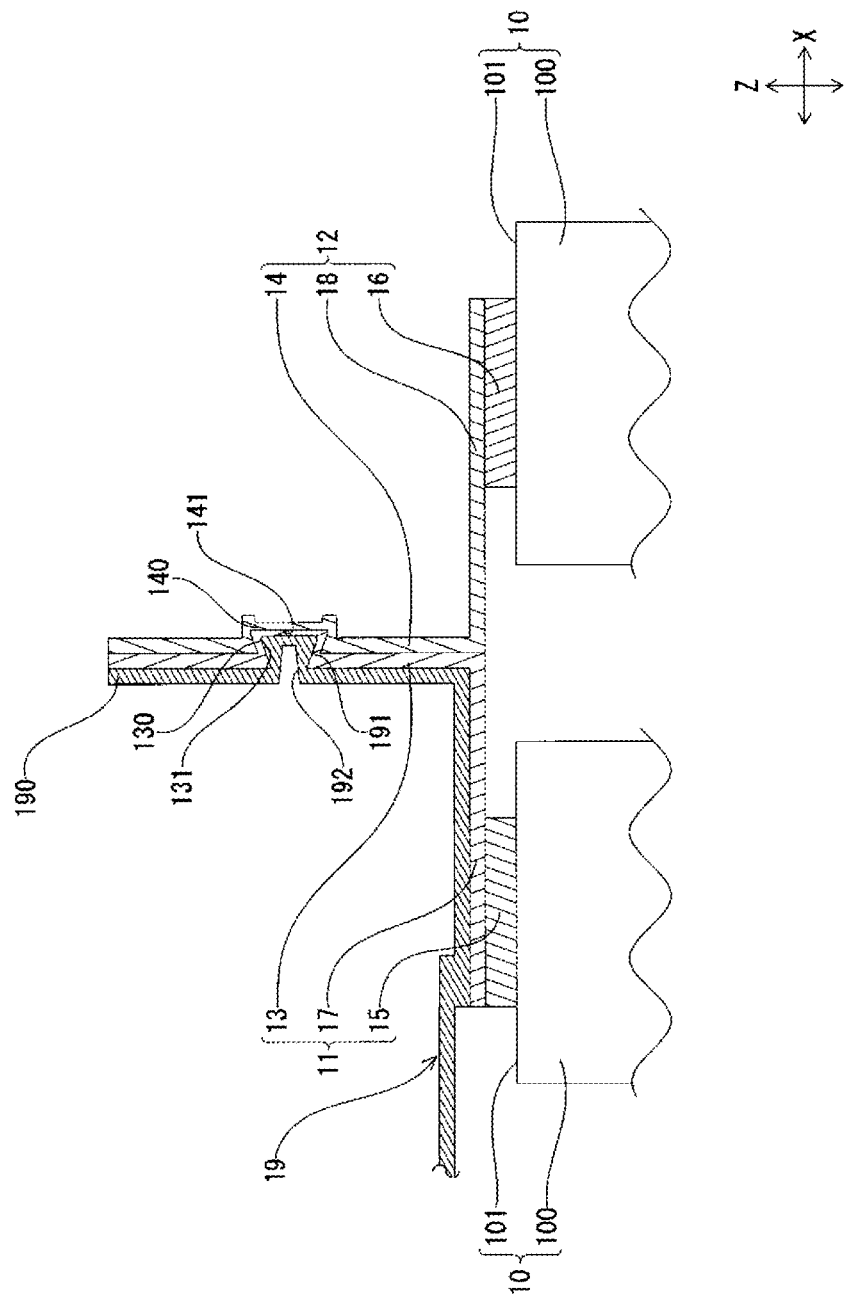
FIG. 9 is a partial enlarged view of an energy storage apparatus according to still another embodiment of the present invention.
Figure 10:
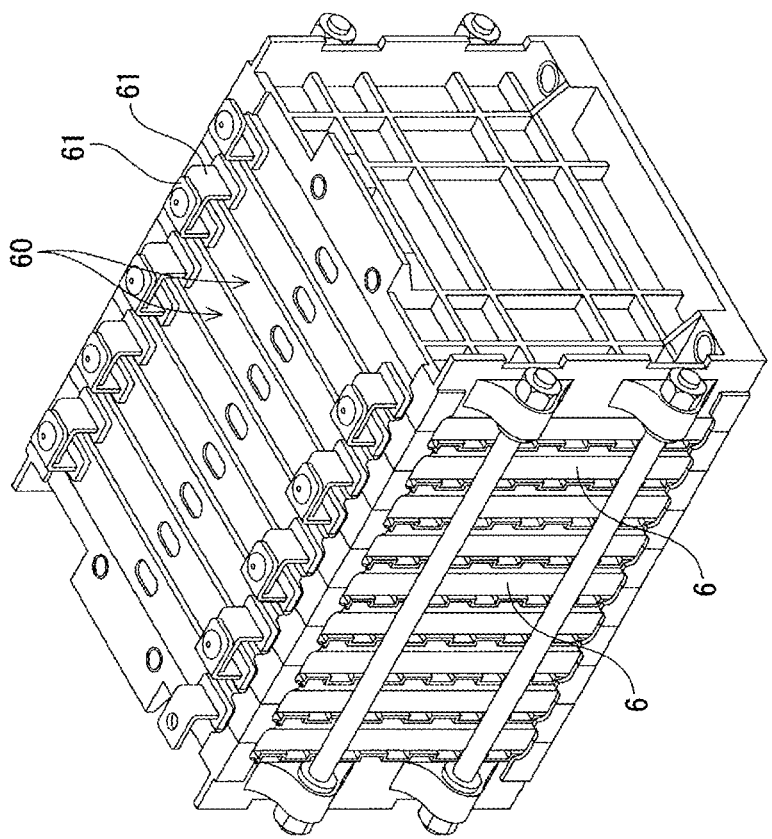
FIG. 10 is a perspective view of a battery pack of the related art.
Figure 11:
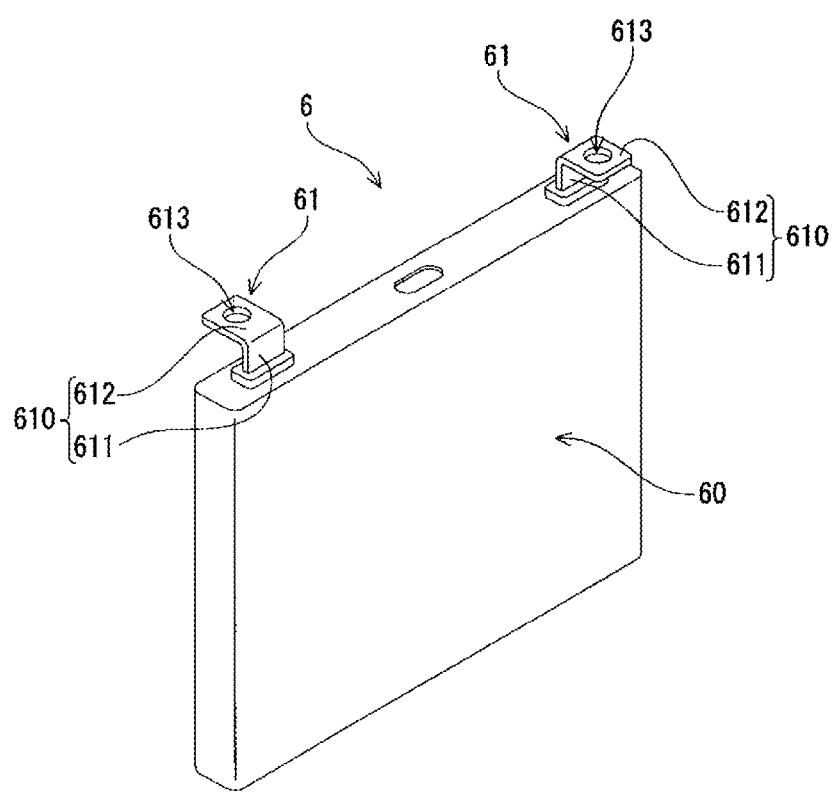
FIG. 11 is a perspective view of an energy storage device in the battery pack of the related art.
Figure 12:
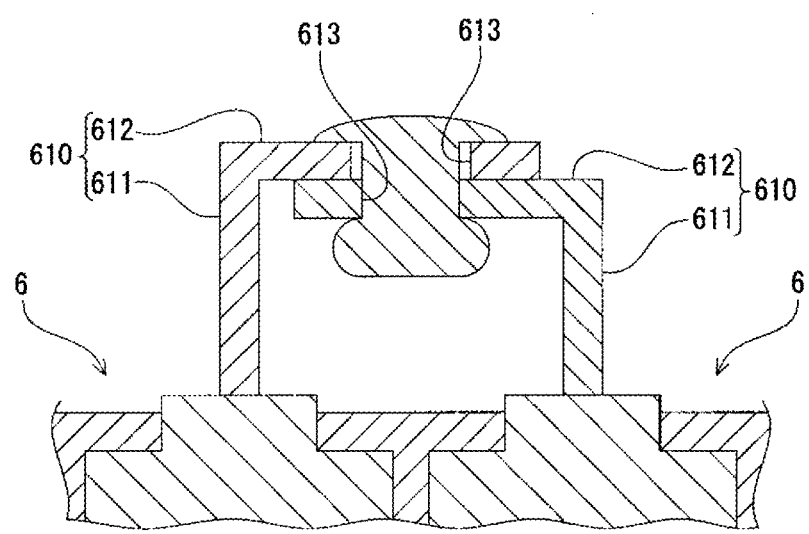
FIG. 12 is a sectional view of external terminals in the battery pack of the related art.

As shown in FIG. 9, the energy storage apparatus may include a sensor member (for example, a temperature sensor, or a voltage sensor) 19 connected to the external terminals 11 and 12.

In this case, the connecting portion 13 of the one external terminal 11 has a first face (mating face) facing the connecting portion 14 of the other external terminal 12 and a second face opposite to the first face. The concave part 131 is formed in a portion corresponding to the convex part 130 on the second face of the connecting portion 13 of the one external terminal 11.

The sensor member 19 includes a connecting portion 190 aligned with the connecting portion 14 of the other external terminal 12 via the connecting portion 13 of the one external terminal 11. The connecting portion 190 of the sensor member 19 includes a convex part 191 protruding into the concave part 131 of the connecting portion 13 in the one external terminal 11. Moreover, the connecting portion 190 of the sensor member 19 includes a concave part 192 that is located opposite to the convex part 191 and recessed in the same direction as a protruding direction of the convex part 191.

In the energy storage apparatus shown in FIG. 9, the sensor member 19 can be electrically connected to the external terminals 11 and 12 by pressing the connecting portion 190 of the sensor member 19 toward the connecting portion 13 of the one external terminal 11 and the connecting portion 14 of the other external terminal 12.

Note that the convex part 140 of the connecting portion 14 of the other external terminal 12 may be fitted into the concave part 192 of the connecting portion 190 of the sensor member 19. Moreover, the connecting portion 190 of the sensor member 19 may include one of the convex part 191 and the concave part 192.

When the connecting portion 190 includes only the convex part 191, the connecting portion 190 is formed by forming the convex part 130 and the concave part 131 with the molds 60 and 61 and subsequently filling the concave part 131 with a metallic material or a resin material. When the connecting portion 190 includes only the concave part 192, the connecting portion 190 is formed by using a flat mold instead of the female mold 61. Moreover, the connecting portion 190 can be formed by forming the convex part 191 and the concave part 192 and subsequently using the male mold 60 and the flat mold to press again locations with the convex part 191 and the concave part 192 formed in the connecting portion 190.

The sensor member 19 may be provided between the pair of external terminals 11 and 12. That is, the convex part 130 of the one external terminal 11 may be fitted indirectly into the concave part 141 of the other external terminal 12 via the sensor member 19. In this case, an anticorrosive layer may be provided between at least one of the pair of external terminals 11 and 12 and the sensor member 19. Specifically, the convex part 130 of the one external terminal 11 may be fitted indirectly into the concave part 141 of the other external terminal 12 via the sensor member 19 having a surface provided with the anticorrosive layer.

The external terminal 11 in the embodiment may be configured such that the conductive member (the connecting portion 13 and the mounting portion 17) and the table 15 are integrally formed or the conductive member (the connecting portion 13 and the mounting portion 17) and the table 15 are separately formed.

Moreover, the external terminal 12 may be configured such that the conductive member (the connecting portion 14 and the mounting portion 18) and the table 16 are integrally formed or the conductive member (the connecting portion 14 and the mounting portion 18) and the table 16 are separately formed.

In the energy storage apparatus in the embodiment, the adjacent energy storage devices 1 are electrically connected to each other by fitting the convex part 130 of the connecting portion 13 of the external terminal 11 into the concave part 141 of the connecting portion 14 of the external terminal 12. However, the configuration is not limited thereto. For example, the energy storage apparatus may further include an external output terminal for connecting the external terminals 11 and 12 of the energy storage device 1 to an external circuit. Here, the external circuit means a circuit that electricity flows through at least partially and that constitutes a part of an electric circuit, such as a motor, a control unit, or another energy storage apparatus.

In this case, the energy storage apparatus may be configured such that one of the external terminals 11 and 12 and the external output terminal includes a connecting portion having at least a convex part, the other of the external terminals 11 and 12 and the external output terminal includes a connecting portion having at least a concave part, and the convex part is fitted into the concave part.

Moreover, the energy storage apparatus having the above-described configuration may further include a sensor member connected to at least one of the external terminals 11 and 12 and the external output terminal. In this case, the sensor member may include a connecting portion having at least one of a convex part fitted into the concave part included in the connecting portions 13 and 14 of the external terminals 11 and 12 or the connecting portion of the external output terminal, and a concave part that the convex part included in the connecting portions 13 and 14 of the external terminals 11 and 12 or the connecting portion of the external output terminal is fitted into.

Note that when each of the connecting portions 13 and 14 of the external terminals 11 and 12 and the connecting portion of the external output terminal includes the convex part and a concave part that is located opposite to the convex part and recessed in the same direction as a protruding direction of the convex part, the convex part of the connecting portion of the sensor member is fitted into the concave parts 131 and 141 of the connecting portions 13 and 14 of the external terminals 11 and 12 or the concave part of the connecting portion of the external output terminal. Moreover, the convex parts 130 and 140 of the connecting portions 13 and 14 of the external terminals 11 and 12 or the convex part of the connecting portion of the external output terminal are fitted into the concave part of the connecting portion of the sensor member.

The techniques applied in the embodiment or the above-described techniques with various modifications that can be made within the scope of the spirit of the present invention may be applied to the energy storage apparatus having the above-described configuration.

In the energy storage apparatus in the embodiment, the adjacent energy storage devices 1 are electrically connected to each other by fitting the convex part 130 of the connecting portion 13 of the external terminal 11 into the concave part 141 of the connecting portion 14 of the external terminal 12. However, the configuration is not limited thereto. For example, the energy storage apparatus may include an external output terminal for connecting the energy storage device 1 to an external circuit, and an external circuit terminal that is a part of the external circuit and is electrically connected to the external output terminal. Note that as described above, the external circuit means a circuit that electricity flows through at least partially and that constitutes a part of an electric circuit, such as a motor, a control unit, or another energy storage apparatus.

In this case, the energy storage apparatus may be configured such that one of the external output terminal and the external circuit terminal includes a connecting portion having at least a convex part, the other of the external output terminal and the external circuit terminal includes a connecting portion having at least a concave part, and the convex part is fitted into the concave part.

Moreover, the energy storage apparatus having the above-described configuration may further include a sensor member connected to at least one of the external output terminal and the external circuit terminal. In this case, the sensor member may include a connecting portion including at least one of a convex part fitted into the concave part included in the connecting portion of the external output terminal or the connecting portion of the external circuit terminal and a concave part that the convex part included in the connecting portion of the external output terminal or the connecting portion of the external circuit terminal is fitted into.

Note that when each of the connecting portion of the external output terminal and the connecting portion of the external circuit terminal includes the convex part and a concave part that is located opposite to the convex part and recessed in the same direction as a protruding direction of the convex part, the convex part of the connecting portion of the sensor member is fitted into the concave part of the connecting portion of the external output terminal or the concave part of the connecting portion of the external output terminal. Moreover, the convex part of the connecting portion of the external output terminal or the convex part of the connecting portion of the external output terminal is fitted into the concave part of the connecting portion of the sensor member.

Moreover, as a technique of improving safety, the connecting portions may each have a function of a fuse, or a function of causing fusion between the external terminals. In this case, for example, it is favorable to decrease the thickness of at least one of the convex part and the concave part.

The techniques applied in the embodiment or the above-described techniques with various modifications that can be made within the scope of the spirit of the present invention may be applied to the energy storage apparatus having the above-described configuration.

What is claimed is:

1. An energy storage apparatus comprising:
   a plurality of energy storage devices each including a pair of external terminals,
   wherein one of two adjacent energy storage devices among the plurality of energy storage devices includes a connecting portion having at least a convex part at one of the pair of external terminals,
   the other of the two adjacent energy storage devices includes a connecting portion having at least a concave part at the other of the pair of external terminals, and
   the convex part is fitted into the concave part.

2. The energy storage apparatus according to claim 1, wherein the convex part of the connecting portion in the one energy storage device includes a front end in a protruding direction, a base end opposite to the front end, and a locking portion having a cross section that becomes larger from the base end toward the front end in a direction orthogonal to the protruding direction of the convex part.

3. The energy storage apparatus according to claim 1, wherein the connecting portion of each of the pair of external terminals in two adjacent energy storage devices among the plurality of energy storage devices includes the convex part and the concave part that is located opposite to the convex part and recessed in the same direction as the protruding direction of the convex part,
   the apparatus further comprising a sensor member connected to at least one of the two adjacent energy storage devices, and
   the sensor member includes a connecting portion having one of a convex part fitted into the concave part of the connecting portion at the one external terminal and a concave part that the convex part of the connecting portion at the other external terminal is fitted into.

4. The energy storage apparatus according to claim 1, wherein the connecting portion of the one external terminal is made of a ductile metal as compared to the connecting portion of the other external terminal.

5. The energy storage apparatus according to claim 1, wherein the connecting portions of the pair of external terminals each have a mating face facing the connecting portion of the adjacent external terminal, and
   an anticorrosive layer is provided at least on the mating face of each of the connecting portion of the one external terminal and the connecting portion of the other external terminal.

6. The energy storage apparatus according to claim 1, wherein the connecting portion of the one external terminal and the connecting portion of the other external terminal are made of different metals, and
   outer peripheries of the mating faces in the connecting portion of the one external terminal and the connecting portion having the concave part that the convex part of the connecting portion is fitted into is at least partially covered with an insulating member.

7. The energy storage apparatus according to claim 1, wherein a thickness of at least the convex part or the concave part decreases as compared to a thickness of a portion other than the connecting portion of the external terminal.

8. An energy storage apparatus comprising:
   at least one energy storage device including an external terminal; and
   an external output terminal for connecting the energy storage device to an external circuit,
   wherein one of the external terminal and the external output terminal includes a connecting portion having at least a convex part,
   the other of the external terminal and the external output terminal includes a connecting portion having at least a concave part, and
   the convex part is fitted into the concave part.

9. The energy storage apparatus according to claim 8, further comprising a sensor member connected to at least one of the external terminal and the external output terminal,
   wherein the connecting portion of each of the external terminal and the external output terminal includes the convex part and the concave part that is located opposite to the convex part and recessed in the same direction as a protruding direction of the convex part, and
   the sensor member includes a connecting portion having at least one of a convex part fitted into the concave part of the connecting portion of the external terminal or the concave part of the connecting portion of the external output terminal, and a concave part that the convex part of the connecting portion of the external terminal or the convex part of the connecting portion of the external output terminal is fitted into.

10. An energy storage apparatus comprising:
    an external output terminal for connecting an energy storage device to an external circuit; and
    an external circuit terminal that is a part of the external circuit and is electrically connected to the external output terminal,
    wherein one of the external output terminal and the external circuit terminal includes a connecting portion having at least a convex part,
    the other of the external output terminal and the external circuit terminal includes a connecting portion having at least a concave part, and
    the convex part is fitted into the concave part.

11. The energy storage apparatus according to claim 10, further comprising a sensor member connected to at least one of the external output terminal and the external circuit terminal,
    wherein the connecting portion of the external output terminal and the connecting portion of the external circuit terminal each include:
    the convex part; and
    the concave part located opposite to the convex part and recessed in the same direction as a protruding direction of the convex part, and
    the sensor member includes a connecting portion having at least one of a convex part fitted into the concave part of the connecting portion of the external output terminal or the concave part of the connecting portion of the external circuit terminal, and a concave part that the convex part of the connecting portion of the external output terminal or the convex part of the connecting portion of the external circuit terminal is fitted into.

* * * * *